United States Patent
Li et al.

(10) Patent No.: US 10,755,104 B2
(45) Date of Patent: Aug. 25, 2020

(54) SCENE LEVEL VIDEO SEARCH

(71) Applicant: HULU, LLC, Santa Monica, CA (US)

(72) Inventors: Fanding Li, Beijing (CN); Xiaohui Xie, Beijing (CN); Yin Zheng, Beijing (CN); Cailiang Liu, Beijing (CN); Bo Liu, Beijing (CN); Hongxiang Chen, Beijing (CN)

(73) Assignee: HULU, LLC, Santa Monica, CA (US)

( * ) Notice: Subject to any disclaimer, the term of this patent is extended or adjusted under 35 U.S.C. 154(b) by 83 days.

(21) Appl. No.: 16/011,181

(22) Filed: Jun. 18, 2018

(65) Prior Publication Data
US 2019/0384987 A1    Dec. 19, 2019

(51) Int. Cl.
*G06K 9/00* (2006.01)
*G06F 16/738* (2019.01)
*G06F 16/783* (2019.01)

(52) U.S. Cl.
CPC ....... *G06K 9/00744* (2013.01); *G06F 16/738* (2019.01); *G06F 16/786* (2019.01); *G06K 9/00718* (2013.01); *G06T 2207/20081* (2013.01)

(58) Field of Classification Search
CPC ........................ G06K 9/00302; G01S 5/0252
USPC ....... 382/190, 159, 171, 128, 115, 103, 173, 382/224
See application file for complete search history.

(56) References Cited

U.S. PATENT DOCUMENTS

| | | | | |
|---|---|---|---|---|
| 2010/0289642 | A1* | 11/2010 | Harrison | G06Q 10/00 340/541 |
| 2016/0196478 | A1* | 7/2016 | Choi | G06K 9/56 382/218 |
| 2016/0295109 | A1* | 10/2016 | Henriksen | H04N 5/23238 |
| 2018/0181802 | A1* | 6/2018 | Chen | G06K 9/00201 |
| 2018/0211140 | A1* | 7/2018 | Davis | G06K 9/6255 |

* cited by examiner

*Primary Examiner* — Kiet M Doan
(74) *Attorney, Agent, or Firm* — Fountainhead Law Group, PC

(57) ABSTRACT

In some embodiments, a method trains a first prediction network to predict similarity between images in videos. The training uses boundaries detected in the videos to train the prediction network to predict images in a same scene to have similar feature descriptors. The first prediction network generates feature descriptors that describe library images from videos in a video library offered to users of a video delivery service. A search image is received and the prediction network predicts one or more library images for one or more videos that are predicted to be similar to the received image. The one or more library images for the one or more videos are provided as a search result.

22 Claims, 8 Drawing Sheets

SCENE LEVEL VIDEO SEARCH

BACKGROUND

When a user wants to perform a search for a video, the user can search by inputting a string of text (e.g., words) and receive search results that list videos that match the text. However, sometimes a user may see something visually, such as the user may be standing in front of a memorable location and wish to know which show or movie has been filmed in this location. Sometimes, the user may not know the exact name of the place and the user may find it more convenient to perform a search by images. Also, the user may like a style of a show or movie but it may be difficult to describe the style of the show or movie in words. However, the user may be able to take a picture of the style, such as a picture of costumes for a movie in the 1920s, for use in video searching.

Some image searches are based on searching low-level visual features of images, such as using color histograms or the texture of an image to search for similar images with the same color histogram or texture. The design of a search framework using the color histogram or texture requires manually-designed operations that make designing the search framework time-consuming. Also, the low-level features ignore the higher level features, such as describing the objects found in the image (e.g., a person, dog, cat, etc.). Other image search frameworks may detect higher level features, such as objects or faces, in the images and search for similar images with the same objects and faces. However, this image search focuses only on a specific part of the image and may not be appropriate to determine which show or movie may be associated with that particular image.

DETAILED DESCRIPTION

Figure 1:
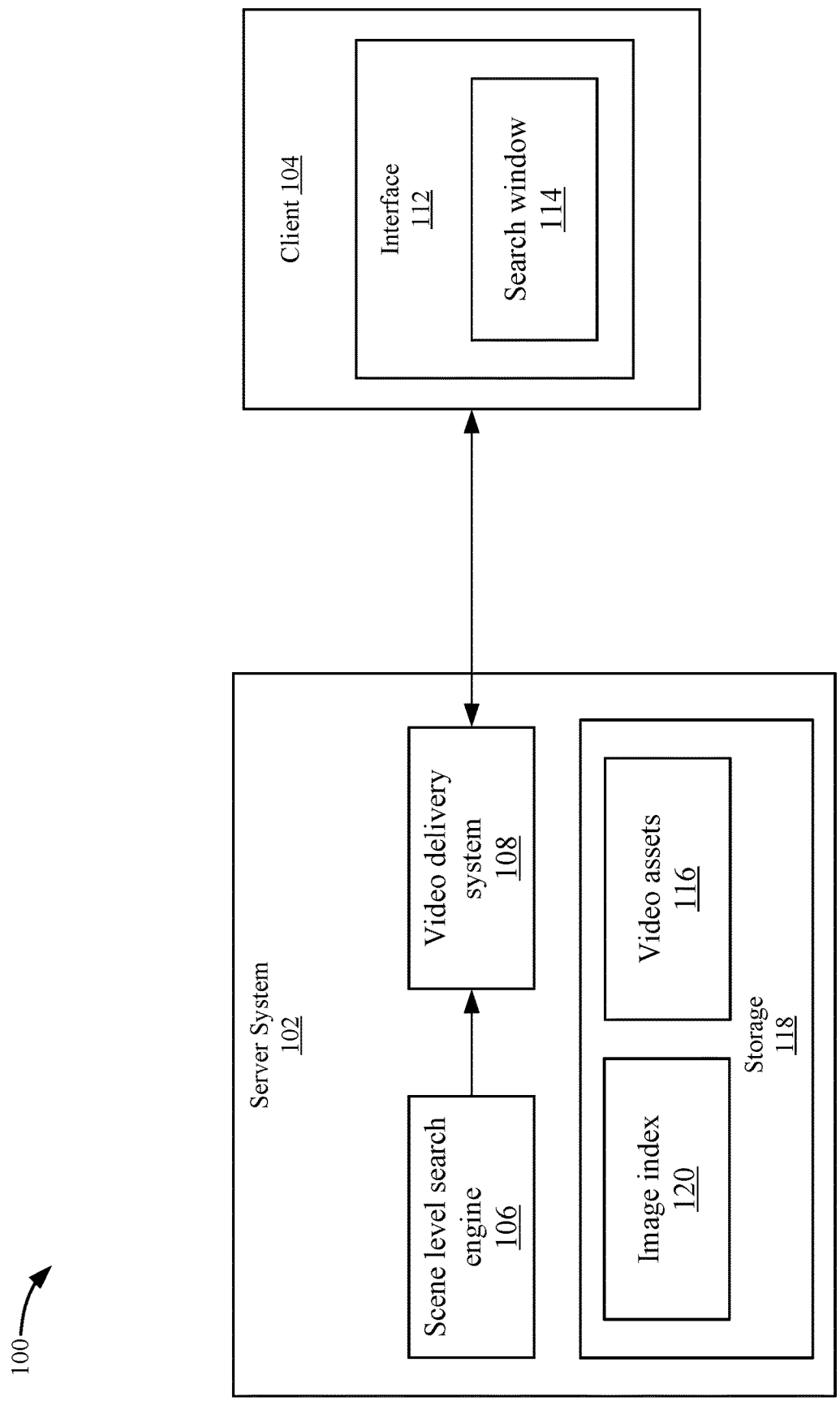
FIG. 1 depicts a simplified system of a method for performing scene-level searches according to some embodiments.

Described herein are techniques for a search system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

A system receives an image that may be provided by a user to perform a search. For example, the user may take a picture of a location, such as a famous restaurant or statue, and use the picture to assist in searching for a video. The system can then search images from video assets being offered by the video delivery service to determine images that include similar scene-level information. The scene-level similarity may focus on high-level semantic information from the image. The high-level semantic information conveys the meaning of the image, such as that the image includes a dog, cat, human, etc. Also, the scene level information may not only include elements in the image (e.g., a dog, a cat, and a human), but also some more abstract definition, such as 'wedding'(event), 'seaside'(scene), 'racing' (combination of elements), etc. The elements describe objects that exist in the image. The abstract definition describes a concept of objects that exist in the image.

To provide the scene-level search, the system uses boundaries from the video to train one or more prediction networks. A scene may be a series of images that have similar content within a threshold and is part of a scene. In the training, the system trains a prediction network to determine that images in the same scene may include similar scene-level information, and images that are from different scenes may not include similar scene-level information. After training, the prediction network can predict images that include the same scene-level similarity.

In some embodiments, the output of the prediction network may classify the features of the image that are detected. For example, the output may be a feature vector that may be a large real-number vector, such as a 4096-dimensional real-number vector that represents the features detected in the image. Instead of a vector for categories, such as a 1000-dimensional vector that represents 1000 categories of an object, the 4096-dimensional vector is a descriptor of the image. Similar images that include similar scene-level information will have a similar descriptor.

The 4096-dimensional real-number may have 4096 dimensions where each dimension could be a real number within each dimension, which may be either rational or irrational numbers; either algebraic or transcendental numbers; and either positive, negative, or zero. When a user performs a search with an image, searching through a large number of 4096-dimensional real number vectors for similar images may take longer than desired when using an online real-time environment to provide search results to a user. Accordingly, the system may apply a feature dimension reduction process to reduce the number of dimensions and possible values. For example, the system uses a second prediction network that reduces the feature dimensions from a 4096-dimensional real number to a lower number of dimensions that can be less possible values for each dimension, such as a 16-dimensional binary number. The binary number may include 16 binary numbers that can be values of 0 or 1. Reducing the number of feature dimensions and the possible values that represent the image may lose some scene-level information. Accordingly, a system performs the feature dimension reduction in ways to reduce the loss of scene-level information as will be described herein.

System Overview

FIG. 1 depicts a simplified system 100 of a method for performing scene-level searches according to some embodiments. A server system 102 includes a video delivery system 108 that interacts with a client 104 that displays an interface 112. Although only a single instance of server system 102 and client 104 is described, it will be understood that server system 102 may include multiple devices that include distributed functions as described below, and also multiple clients 104 may be interacting with server system 102. Video delivery system 108 may be associated with a video delivery service that provides videos assets 116 to client 104, which accesses the videos through interface 112. Video assets 116 may include movies, shows, clips, etc. that are offered by the video delivery service.

A scene-level search engine 106 can perform searches that may determine images from video assets being offered by the video delivery service. For example, a user may use a search window 114 in interface 112 to provide a search image. The search image may be taken by the user using a camera or may be uploaded by the user to search window 114. Scene-level search engine 106 can then search an image index 120 to determine library images that have similar scene-level information as the search image. Library images are images associated with video assets 116.

Prior to receiving a search query, scene-level search engine 106 trains prediction networks to predict similar images within boundaries of scenes. The images within the boundary may be in a scene of the video and most likely include similar information, such as because the scene occurs in a same location with a same camera angle. Scene-level search engine 106 uses a prediction network to analyze the images of video assets 116 from a storage 118 to generate feature descriptors for the images. The feature descriptor may describe characteristics of the images. Due to the training, scene-level search engine 106 trains the prediction network to predict images within the same shot boundary have similar feature descriptors and images not within the same scene boundary do not have similar feature descriptors. Scene-level search engine 106 then stores the feature descriptors in an image index 120 in storage 118.

When a search request is received with a search image, scene-level search engine 106 may input the search image into the prediction network to generate a feature descriptor. Scene-level search engine 106 retrieves library images from image index 120 that have similar feature descriptors. Because the prediction networks were trained to detect similar scene level information, images from image index 120 with similar feature descriptors may have similar scene level information to the search image. That is, the search image may be similar to library images within a scene boundary. Also, these library images are associated with video assets 116. For example, a first image is associated with a Movie #1 and a second image is associated with a Movie #2.

Scene-level search engine 106 may then send the similar library images to interface 112. Interface 112 may display the similar library images in search window 114. Also, the similar library images may be associated with respective video assets 116 being offered by the video delivery service. A user may then select one of the library images and video delivery service 108 may play the respective video asset in response. Accordingly, users may use a search image to search for similar library images that include similar scene-level information. Also, the similar library images may then be used to request videos for playback.

The use of the scene-level information may provide video recommendations that are more relevant to the search image received. This is because the image may match a scene in the video more accurately than if low-level features were used to perform the search, such as a color histogram or objects. The use of the scene-level information may provide more relevant results for a user searching for videos because videos with similar scenes are being recommended instead of just images that include similar objects.

Scene-Level Search Engine

Figure 2:
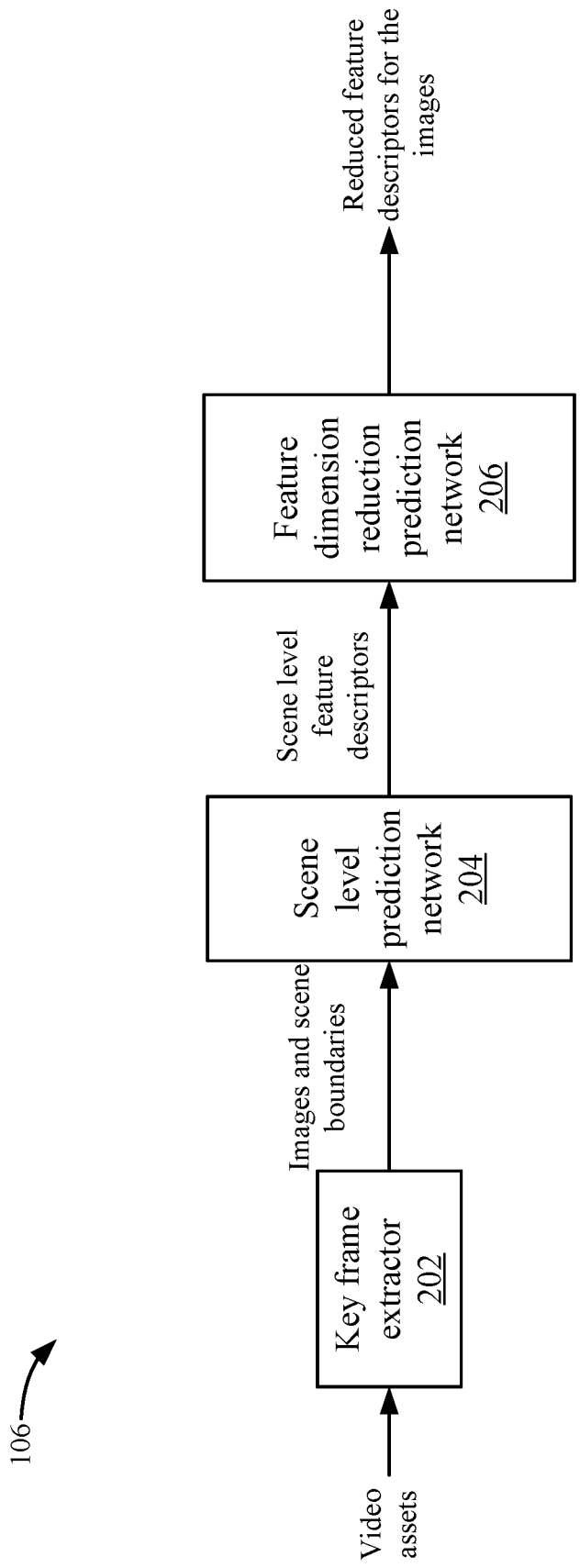
FIG. 2 depicts a more detailed example of a scene-level search engine according to some embodiments.

FIG. 2 depicts a more detailed example of scene-level search engine 106 according to some embodiments. Scene-level search engine 106 includes a key frame extractor 202, a scene-level prediction network 204, and a feature dimension reduction prediction network 206. In some embodiments, feature dimension reduction prediction network 206 may not be used.

Key frame extractor 202 receives video assets 116 from storage 118. As mentioned above, video assets 116 may be part of a video library that the video delivery service offers to users. However, video assets 116 may also be video assets available from other services, such as video assets that could be requested on another service. Also, in addition to video assets, key frame extractor 202 may receive images from other sources, such as web pages.

Key frame extractor 202 extracts images from the video assets. The images may be key frames, which may be an intra-frame in which the complete image is stored in the data stream and does not require any information from other frames to decode the frame. Although key frames are described, other types of images may be used, such as B-frames. In some embodiments, key frame extractor 202 may attempt to select images that have less motion blur. The motion blur may occur in images where movement of objects is present. Key frame extractor 202 may select images with less motion blur because these images are clearer and its features can be distinguished more accurately. In some embodiments, key frame extractor 202 may analyze a color histogram that describes the color of the image and find a stable point that has only small changes in the histogram before and after the selected frame. When a small change is found below a threshold, key frame extractor 202 determines that this image includes content without a large amount of motion blur.

Key frame extractor 202 also determines boundaries, such as scene level boundaries, based on changes in content meeting a threshold (e.g., the change in content is at or above a threshold). A scene may be a collection of images that may include similar content, such as a collection of images that have similar content that form part of a scene in a video. In a video, there may be content transitions, such as a fade in and fade out (e.g., the video gradually goes to black frames and the content gradually appears), or a sharp transformation of a score rating the content change (e.g., a shot-boundary-detection-score, which mainly includes color histogram features). These transitions may form scene level boundaries. Key frame extractor 202 may tolerate some amount of change before declaring a scene level boundary. For example, key frame extractor 202 tolerates a change in the camera angle movement within a threshold, such as a content change score will not change sharply when the camera is not moving very fast. Also, key frame extractor 202 may tolerate some fast shot changes, such as when two people are chatting, and the camera switches from one to another very fast so as to not declare scene level boundaries when the two people are in the same scene in the video. In some embodiments, key frame extractor 202 uses a sliding window of N frames, such as 15 frames, which is about 0.5 seconds of video to tolerate a change above a threshold. The threshold denotes that if a frame has a similar score (under a certain threshold) within in the past 15 frames, then all these frames are in one scene. In other embodiments, the boundaries may be shots, which may be multiple images that are taken by a single camera in a shot. Then, the video may transition to another shot, which may be in the same scene or another scene. The new shot includes another set of images captured by another camera at a different camera angle. When a video transitions from one camera angle to another camera angle, a shot boundary is generated at the transition. The different camera angles may be used in the same scene. For example, the different camera angles may be used in a same scene when characters are talking in a coffee shop. After the scene at a coffee shop ends, a scene in a living room may begin. Another shot boundary between the scene at the coffee shop and the scene in a living room is then generated.

Scene-level prediction network 204 receives the images and the scene boundaries from key frame extractor 202. Scene-level prediction network 204 may include a prediction network that receives an image and then can output a feature descriptor of the image. The feature descriptor may describe high level features that contained low level features characteristics of the entire image. In some embodiments, scene-level prediction network 204 does not attempt to focus on some part of the image but rather the entire content of the image as a whole when analyzing the image. Scene-level prediction network 204 may add a layer at the end of the prediction network that generates a feature descriptor that describes the characteristics of the image. In some embodiments, the output is a N-dimensional feature vector, such as a 4096-dimensional feature vector. Each dimension may describe a feature of the image. The feature vector may describe the characteristics of the image for scene level similarity, such as an event, a scene, or a combination of objects, etc., instead of classifying the image into specific categories. For example, a conventional neural network classifies an image in a category of the Eiffel Tower when the image includes the Eiffel Tower instead of describing the characteristics of the image.

Given that scene-level prediction network 204 attempts to determine images that have scene level similarity, the training of scene-level prediction network 204 attempts to train the neural network to predict scene-level similarity instead of reducing the classification error. Conventionally, when an image was classified into different categories, the training process used a loss function to reduce the classification error, that is, reduce the error of classifying the image in the wrong category. However, scene-level prediction network 204 is trained to detect similar images at the scene level. As will be described in more detail, scene-level prediction network 204 uses the scene boundaries in the training process to train the parameters of the network to detect images in the same scene as being similar and images that are not in the same scene to not be similar. After training, the feature descriptors of the images in the same scene may be more similar (a smaller distance in a vector space) than those in different scenes (e.g., a larger distance in the vector space).

Feature dimension reduction prediction network 206 receives feature descriptors and may reduce the size of the feature descriptors. For example, the feature descriptors may describe the features in different dimensions, such as by a 4096-dimensional real number vector. The real number vector may include 4096 dimensions that may have values of a real number. When performing a search for a similar image, the searching of the 4096-dimensional real number vectors for a large amount of images may take longer than desired, especially when a user is expecting search results to be displayed immediately.

Feature dimension reduction prediction network 206 may reduce the number of dimensions and possible values for the dimensions using a prediction network. For example, feature dimension reduction prediction network 206 may reduce the 4096-dimensional real number vector to a 16-dimensional binary feature vector. The 16-dimensional binary feature vector may include 16 dimensions and each dimension may include a binary number of 0 or 1. Thus, the number of dimensions has been reduced in addition to the number of possible values for each dimension. Although 16 dimensions and binary numbers are discussed, other reductions may be appreciated, such as 32 dimensions and a number of possible values within a range (e.g., from 0-10 possible values).

Reducing the dimensions may allow for a faster search to determine similar images because less information needs to be compared between images; however, reducing the dimension may lose some scene-level information. Some embodiments reduce the feature dimensions while considering the scene-level similarity. For example, feature dimension reduction prediction network 206 may be trained to reduce the feature dimensions while maintaining scene-level similarity by making two of the 16-dimensional binary vectors similar (e.g., closer in the vector space) only if the vectors have similar 4096-dimensional scene-level features. Two images are similar on scene-level by similar scene-level features, which means the 4096-dimensional real number vectors of the images are similar (e.g., a small distance difference in the 4096-dimensional vector space.) Additionally, feature dimension reduction prediction network 206 is trained to make the values for the 16-dimensional binary feature vector distributed evenly so that images fall into different buckets (e.g., different representations) and are easy to search for and index. Unlike existing binary descriptors that are designed with random projections or linear hashing functions, feature dimension reduction prediction network 206 may be trained in an unsupervised manner and can preserve scene-level similarity. For example, for two dimensional binary features: there are only 4 representations (e.g., 00, 01, 10, and 11) and each representation it is called a bucket. So, some embodiments do not want all of the images to have the representation of '00', because if so, the images will be all the same when doing an image search. Some embodiments distribute the binary feature vectors evenly after feature dimension reduction in the four buckets 00/01/10/11. This causes the four buckets to have nearly the same number of image descriptors. Feature dimension reduction prediction network 206 may attempt to increase the information represented by the binary distributors in the 16 dimensions, which may use each dimension to classify an image. This may increase the usefulness of each dimension in predicting the features. If a small number of dimensions were used to describe the features of the image, then the other dimensions are not useful in predicting the features. Then, it would be harder to distinguish between similar images because fewer dimensions are significant in describing the features in the image.

Feature dimension reduction prediction network 206 outputs the reduced feature descriptors for the images. Scene-level search engine 106 may store the feature descriptors in image index 120. In some embodiments, image index 120 may be a hash index that hashes the binary descriptors and indexes the hash values with identifiers for the images. For example, a hash value for a binary descriptor corresponds to images that have the same binary descriptor. Scene-level prediction network 204 and feature dimension reduction prediction network 206 are now trained and can then be used to perform a search for similar images from a received search image.

Figure 3:
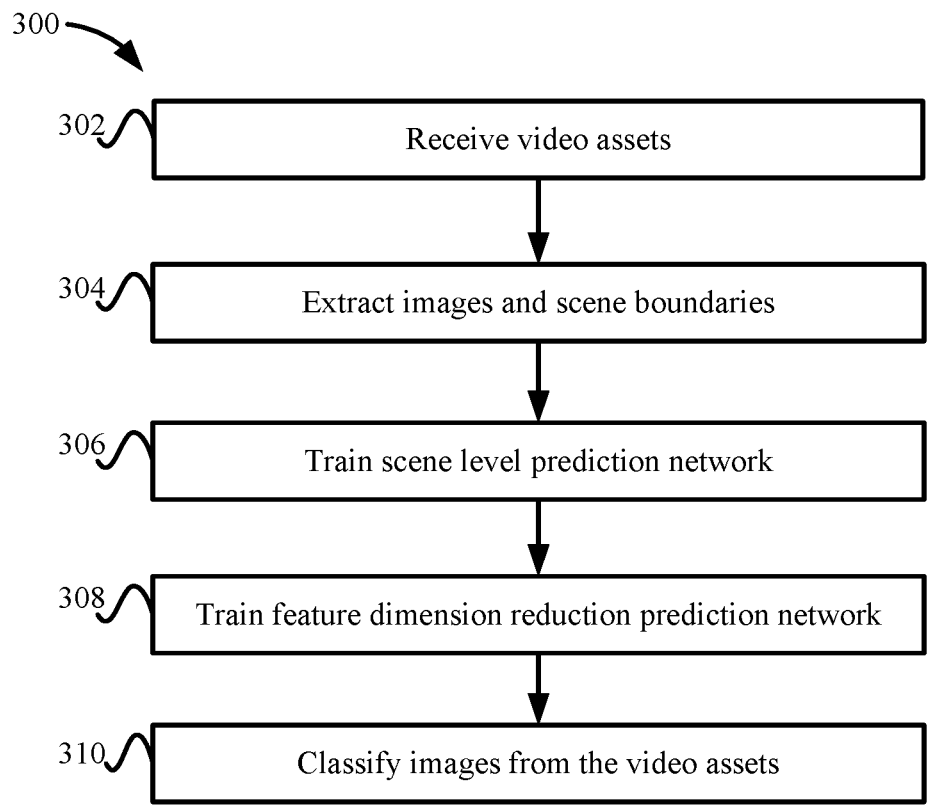
FIG. 3 depicts a simplified flowchart of the training process according to some embodiments.

FIG. 3 depicts a simplified flowchart 300 of the training process according to some embodiments. At 302, key frame extractor 202 receives video assets. At 304, key frame extractor 202 extracts images and the scene boundaries.

At 306, scene-level prediction network 204 is trained. For example, scene-level prediction network 204 may be trained using the scene boundaries to detect similar images in the same scene and detect dissimilar images in different scenes. The images are sampled and sorted into pairs where X pairs are in the same scene and Y pairs are in a different scene. Then, the total number of pairs may be input one pair at a time into scene-level prediction network 204. For example, 2000 pairs in the same scene and 5000 in different scenes may be used. The higher number of pairs in different scenes may be used because there may be a higher amount of images in different scenes than those within the same scene.

For each pair, scene-level prediction network 204 outputs a pair of feature descriptors, such as 4096-dimensional feature vectors. A trainer may optimize the parameters of scene-level prediction network 204 using:

$$L(w) = \frac{1}{n}\sum_{i=1}^{n} \sigma(i) \cdot \text{Distance}(f(x_{i1}; w), f(x_{i2}; w)),$$

where the variable i represents the input pair, the variable $x_{i1}$ represents the first image, the variable $x_{i2}$ represents the second image, and the variable w represents a parameter to optimize. The parameter w denotes the parameters of the prediction network, including the weight and bias of each layer, size of convolutional layer, number of convolution kernel, other hyperparameters, etc. The function Distance may measure a distance between the pair, such as the Cosine distance:

$$\text{Dist}(A, B) = 1 - \frac{A \cdot B}{\|A\|\|B\|}$$

The similarity between the pair is:

$$\text{Similarity}(f_1, f_2) = \frac{f_1 \cdot f_2}{\|f_1\|\|f_2\|}$$

The parameter w is optimized above. For example, if a pair of images are in the same scene, then the variable $\sigma(i)=1$, otherwise the variable $\sigma(i)=-1$. The value "1" indicates that the images are similar. By minimizing the function L(w), the trainer optimizes the parameter w of the prediction network to make images in the same scene to have a higher feature similarity (e.g., lower vector distance) while increasing the feature vector distance of those image pairs in different scenes (e.g., higher vector distance).

At 308, feature dimension reduction prediction network 206 is trained. The training may use a function that minimizes a quantization loss between the binary descriptor and the feature vector generated by scene-level prediction network 204. The training also makes the binary value 0 or 1 evenly distributed across the binary dimensions, which increases the information representativeness of the binary descriptors and increases the usage of each binary descriptor of the binary vector. The following may be used to train feature dimension reduction prediction network 206:

$$L_{QL} = \sum_{i=1}^{N} \|\text{binary}(i) - f(x_i; w)\|,$$

$$L_{ED} = \sum_{j=1}^{16} \left\|\frac{1}{N}\sum_{i}^{N} \text{binary}(i)_j - 0.5\right\|^2, \text{ and}$$

$$L(w) = \alpha L_{QL} + \beta L_{ED} + \gamma \text{Regularization}(w),$$

where the function binary(i) represents the binary descriptor of the input i, and the function binary(i)$_j$ denotes the binary value j-th bin (e.g., dimension). The perfect status is: for each bin, there are half of inputs have the value 0, and the other half have the value 1. In the variable $L_{QL}$, the trainer keeps the quantization of the feature vector, to ensure that the feature reduction does not lose much information, especially the scene-level information. The quantization may be the amount of loss as a result of compression. The variable $L_{QL}$ denotes the quantization loss, e.g., the scene-level information loss. When training the prediction network, the trainer attempts to minimize the loss function. So, the variable $L_{QL}$ is supposed to decrease during training and in this way maintain quantization and minimize scene-level loss. While in the variable $L_{ED}$, the trainer needs the feature to locate to different bucket of the binary descriptor. The variable $L_{ED}$ makes the 16-dimensional binary feature vector evenly distributed $$\frac{1}{N}\sum_{i}^{N} \text{binary}(i)_j$$

is the average value of j-th dimension among all binary representations, and the trainer attempts to make it 0.5 for each dimension. Using the two-dimensional binary descriptor as example, if there are four images, the trainer can prove that buckets '00', '01', '10', '11' will make the variable $L_{ED}$ value the smallest (e.g., 0), and that other solutions all could not make $L_{ED}$ to be zero. In some embodiments, the parameter $\alpha$ is set as 0.5, and the parameter $\beta$ is set as 0.3, the parameter $\gamma$ is set as 0.2. The above balances the trade-off of quantization laws and feature dimension reduction. The parameters show how the trainer balances 'quantization loss' and 'evenly distributed' and 'overfitting' (regularization will reduce an overfitting phenomenon). Evenly distributed is distributing the images across buckets and overfitting is classifying the images in too few buckets. If $\alpha=1$, $\beta=0$, $\gamma=0$, the trainer only focuses on keeping quantization. If $\alpha=0$, $\beta=1$, $\gamma=0$, the trainer only focuses on even distribution.

The above training process in 306 and 308 may be performed separately because training the two prediction networks may be different. That is, scene-level prediction network 204 is trained in pairs and feature dimension reduction prediction network 206 is trained using single images. However, scene-level prediction network 204 and feature dimension reduction prediction network 206 may be trained as a single architecture. For example, scene-level prediction network 204 may be trained using pair-wise training of a pair of images. Once scene-level prediction network 204 is trained, the parameters may be fixed in scene-level prediction network 204, and then the images used in the pairs may train feature dimension reduction prediction network 206.

Once prediction networks 204 and 206 are trained, at 310, scene-level search engine 106 classifies images from the video assets.

Scene-Level Prediction Network

Figure 4:
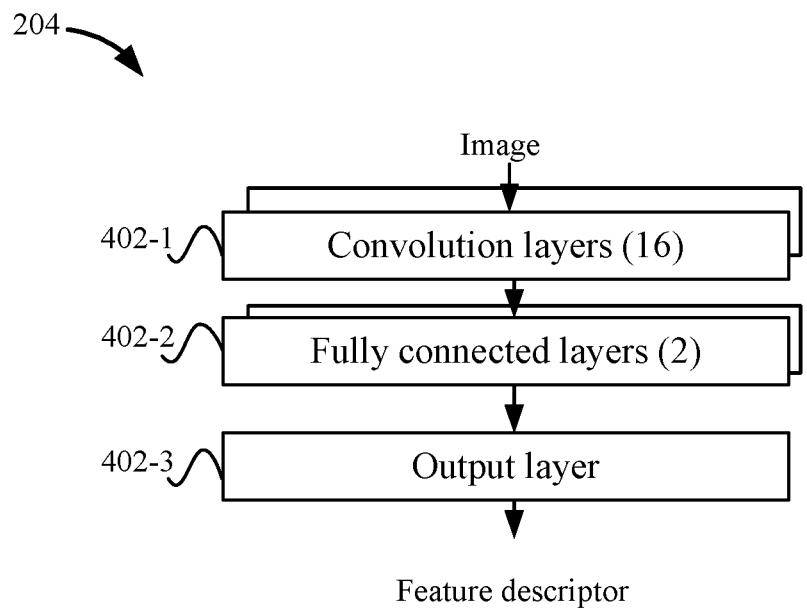
FIG. 4 depicts an example of a scene-level prediction network according to some embodiments.

FIG. 4 depicts an example of scene-level prediction network 204 according to some embodiments. In some embodiments, scene-level prediction network 204 includes a neural network with multiple layers. An input image is received at a first number of layers 402-1. In some embodiments, the first number of layers includes convolution layers, such as N number of convolution layers are included (e.g., 16 convolution layers). First number of layers 402-1 may extract features of the image and classify those images into different categories. First number of layers 402-1 may extract low-level features of the image. The low-level features may be minor details of the image, such as edges, lines, dots or curves of the image. The first number of layers may apply a convolution operation to the input and pass the result to the next layer.

Fully-connected layers 402-2 are then used to detect the higher-level features. Higher-level features may have more meaning, such as the hands, paws, heads or trees in an image. Fully-connected layers 402-2 have nodes that are fully connected to the prior layer. Fully-connected layers 402-2 can detect higher-level features and be used to classify the image into different categories. For example, a classification may be that the image includes a bird or a dog.

As discussed above, scene-level prediction network 204 is not attempting to classify the image. Accordingly, scene-level prediction network 204 includes an output layer 402-3 that can generate a feature descriptor that is based on the scene-level similarity. Output layer 402-3 may also be a fully-connected layer 402-2. However, instead of classifying image features into different categories, output layer 402-3 may output a feature vector that is based on scene-level similarity, such as a 4096-dimensional feature vector.

Feature Dimension Reduction Prediction Network

Figure 5:
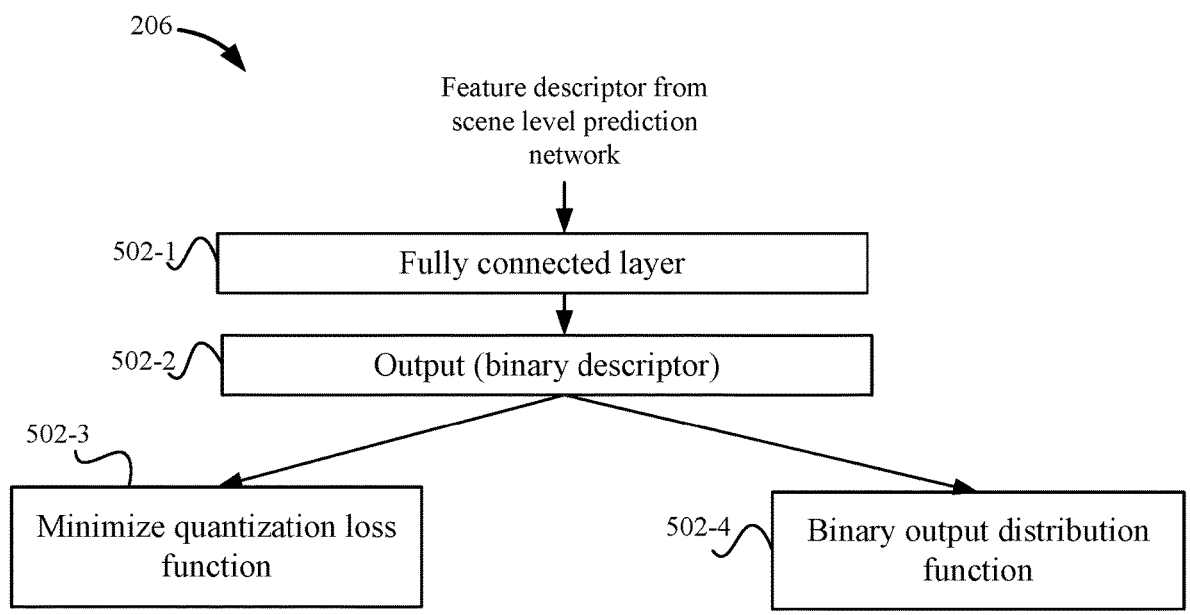
FIG. 5 depicts an example of a feature dimension reduction prediction network according to some embodiments.

FIG. 5 depicts an example of feature dimension reduction prediction network 206 according to some embodiments. Feature dimension reduction prediction network 206 includes a neural network that includes one or more layers that receive the feature descriptor from scene-level prediction network 204. As described above, the feature descriptor may be a 4096-dimensional real number. A fully-connected layer 502-1 receives the feature descriptor and can reduce the size of feature descriptor to a 16-dimensional binary number at 502-2. The output may be a 16-dimensional number or binary vector. The output layer is fully connected from 4096 nodes to 16 nodes. So, there will be 4096*16=65536 edges from the fully-connected layer to the output layer to reduce the size of feature descriptor.

Feature dimension reduction prediction network 206 may include a two-part function to train feature dimension reduction prediction network 206. A minimize quantization loss function 502-3 may minimize the quantization loss between the binary descriptor and the feature vector. The quantization loss may be the amount of loss as a result of compression, such as from the 4096-dimensional real number to the 16-dimensional binary descriptor. Also, the binary output distribution function 502-4 may attempt to distribute the binary values in the 16-dimensional binary descriptor more evenly. This increases the information representation of the binary descriptors by using all of the dimensions to describe the image.

Search Process

Figure 6:
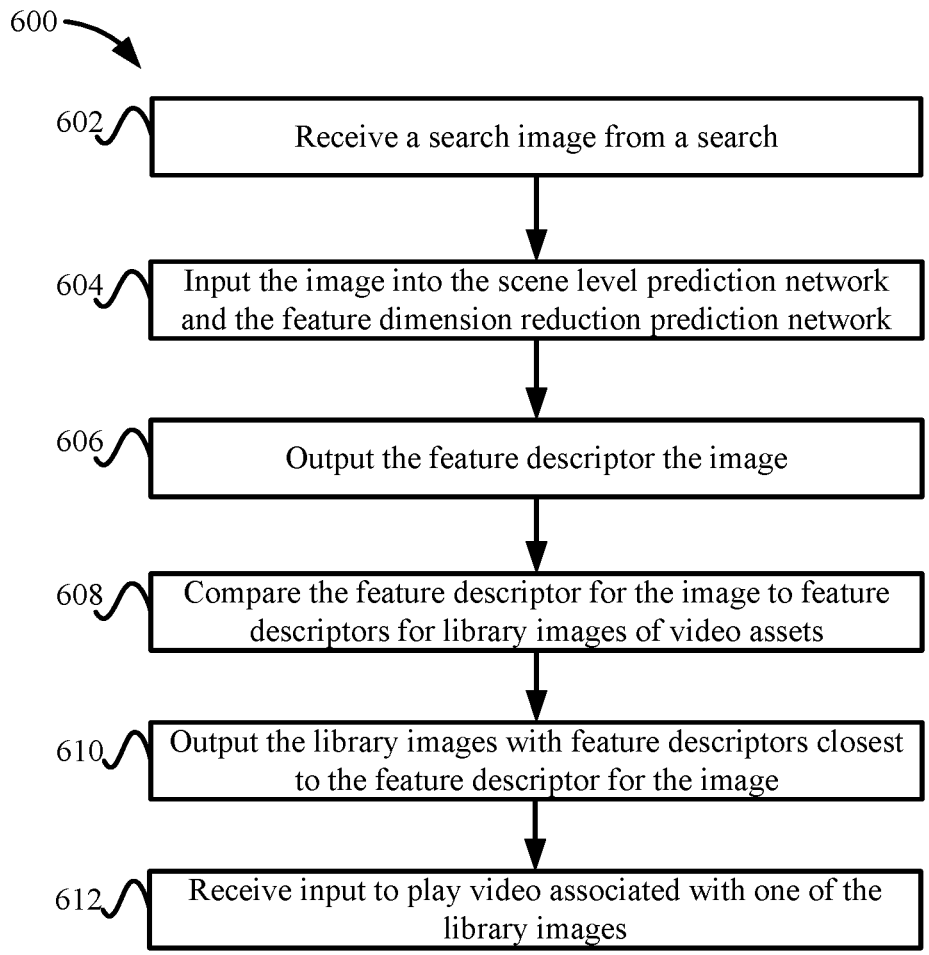
FIG. 6 depicts a simplified flowchart of a method for performing the search process according to some embodiments.

FIG. 6 depicts a simplified flowchart 600 of a method for performing the search process according to some embodiments. At 602, scene-level search engine 106 receives a search image from a user. For example, a user may take an image and input the image into search window 114. Interface 112 sends the image to scene-level search engine 106. At 604, scene-level search engine 106 inputs the image into scene-level prediction network 204 and feature dimension reduction prediction network 206. At 606, feature dimension reduction prediction network 206 outputs the feature descriptor for the search image.

At 608, scene-level search engine 106 compares the feature descriptor for the search image to feature descriptors for the library images for video assets in storage 118. For example, scene-level search engine 106 uses the feature descriptor for the search image to search image index 120 to determine N feature descriptors that are close to the feature descriptor for the search image. In this example, five or ten feature descriptors with values closest to the feature descriptor of scene-level search engine 106 are determined. In some embodiments, each feature descriptor may be listed in image index 120 with a corresponding list of library images for videos. Scene-level search engine 106 retrieves the list of library images for that feature descriptor from image index 120.

At 610, scene-level search engine 106 outputs the library images with feature descriptors closest to the feature descriptor for the search image. Additionally, scene-level search engine 106 may link the library images to video assets associated with the library images. For example, if a library image is associated with a first video, the user may select the first library image and have the first video played back. Similarly, a second image may be associated with a second video asset and the user may select the second library image and have the second video asset played back.

CONCLUSION

Some embodiments perform an image search that considers scene-level similarity. This consideration provides a more relevant search by finding library images from videos that may more accurately be similar to a search image received from a user. Additionally, the scene-level search may more accurately identify images from videos being offered by a video delivery service. Some embodiments use a scene boundary to train a prediction network that can determine scene-level similarity. The training may use images in the same scene and images that are not in the same scene to train parameters of the prediction network. Training using the scene boundaries increases the accuracy of the prediction network using the fact that images within the same scene are more similar. Also, the feature dimension reduction prediction network may be used to reduce the size of the feature descriptor for the images. When a large number of videos with library images being indexed are offered by the video delivery service, the reduced feature vector may improve the search process and be able to find library images that match the received search image faster. Additionally, the feature reduction may be performed while preserving the scene-level information. This preservation provides search results faster and that may still be accurate on the scene level.

System

Figure 7:
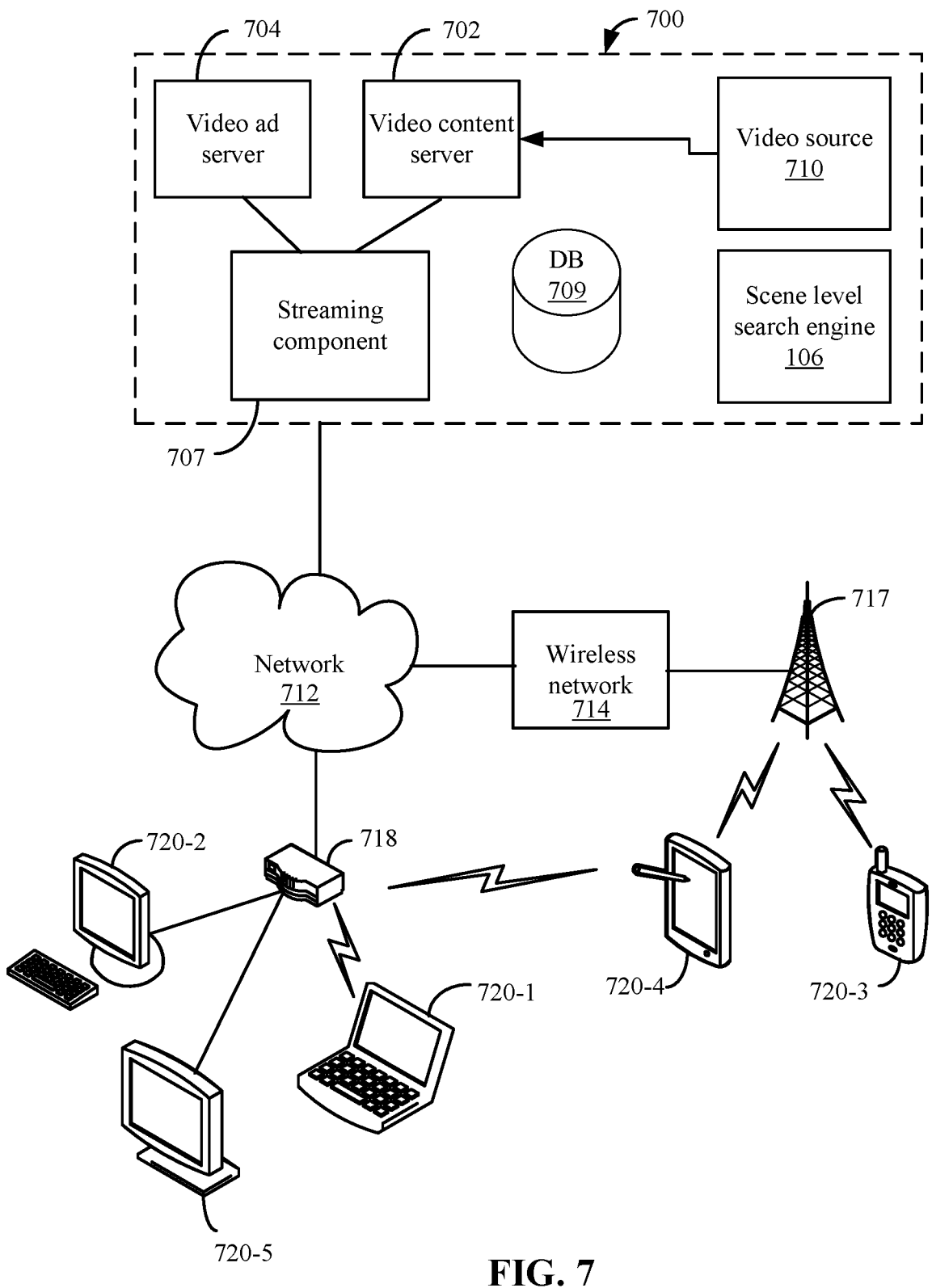
FIG. 7 depicts a video streaming system in communication with multiple client devices via one or more communication networks according to one embodiment.

Features and aspects as disclosed herein may be implemented in conjunction with a video streaming system 700 in communication with multiple client devices via one or more communication networks as shown in FIG. 7. Aspects of the video streaming system 700 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 700, video data may be obtained from one or more sources for example, from a video source 710, for use as input to a video content server 702. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 700 may include one or more computer servers or modules 702, 704, and/or 707 distributed over one or more computers. Each server 702, 704, 707 may include, or may be operatively coupled to, one or more data stores 709, for example databases, indexes, files, or other data structures. A video content server 702 may access a data store (not shown) of various video segments. The video content server 702 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 704 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 700, a public service message, or some other information. The video advertising server 704 may serve the video advertising segments as directed by a user interface controller (not shown).

The video streaming system 700 also may include scene level search engine 106.

The video streaming system 700 may further include an integration and streaming component 707 that integrates video content and video advertising into a streaming video segment. For example, streaming component 707 may be a content server or streaming media server. A controller (not shown) may determine the selection or configuration of advertising in the streaming video based on any suitable algorithm or process. The video streaming system 700 may include other modules or units not depicted in FIG. 7, for example, administrative servers, commerce servers, network infrastructure, advertising selection engines, and so forth.

The video streaming system 700 may connect to a data communication network 712. A data communication network 712 may comprise a local area network (LAN), a wide area network (WAN), for example, the Internet, a telephone network, a wireless cellular telecommunications network (WCS) 714, or some combination of these or similar networks.

One or more client devices 720 may be in communication with the video streaming system 700, via the data communication network 712, wireless cellular telecommunications network 714, and/or another network. Such client devices may include, for example, one or more laptop computers 720-1, desktop computers 720-2, "smart" mobile phones 720-3, tablet devices 720-4, network-enabled televisions 720-5, or combinations thereof, via a router 718 for a LAN, via a base station 717 for a wireless cellular telecommunications network 714, or via some other connection. In operation, such client devices 720 may send and receive data or instructions to the system 700, in response to user input received from user input devices or other input. In response, the system 700 may serve video segments and metadata from the data store 709 responsive to selection of media programs to the client devices 720. Client devices 720 may output the video content from the streaming video segment in a media player using a display screen, projector, or other video output device, and receive user input for interacting with the video content.

Distribution of audio-video data may be implemented from streaming component 707 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 707 may communicate with client device 720 using control messages and data messages to adjust to changing network conditions as the video is played. These control messages can include commands for enabling control functions such as fast forward, fast reverse, pausing, or seeking to a particular part of the file at the client.

Since streaming component 707 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 707 may use TCP-based protocols, such as HTTP and Real Time Messaging Protocol (RTMP). Streaming component 707 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 8:
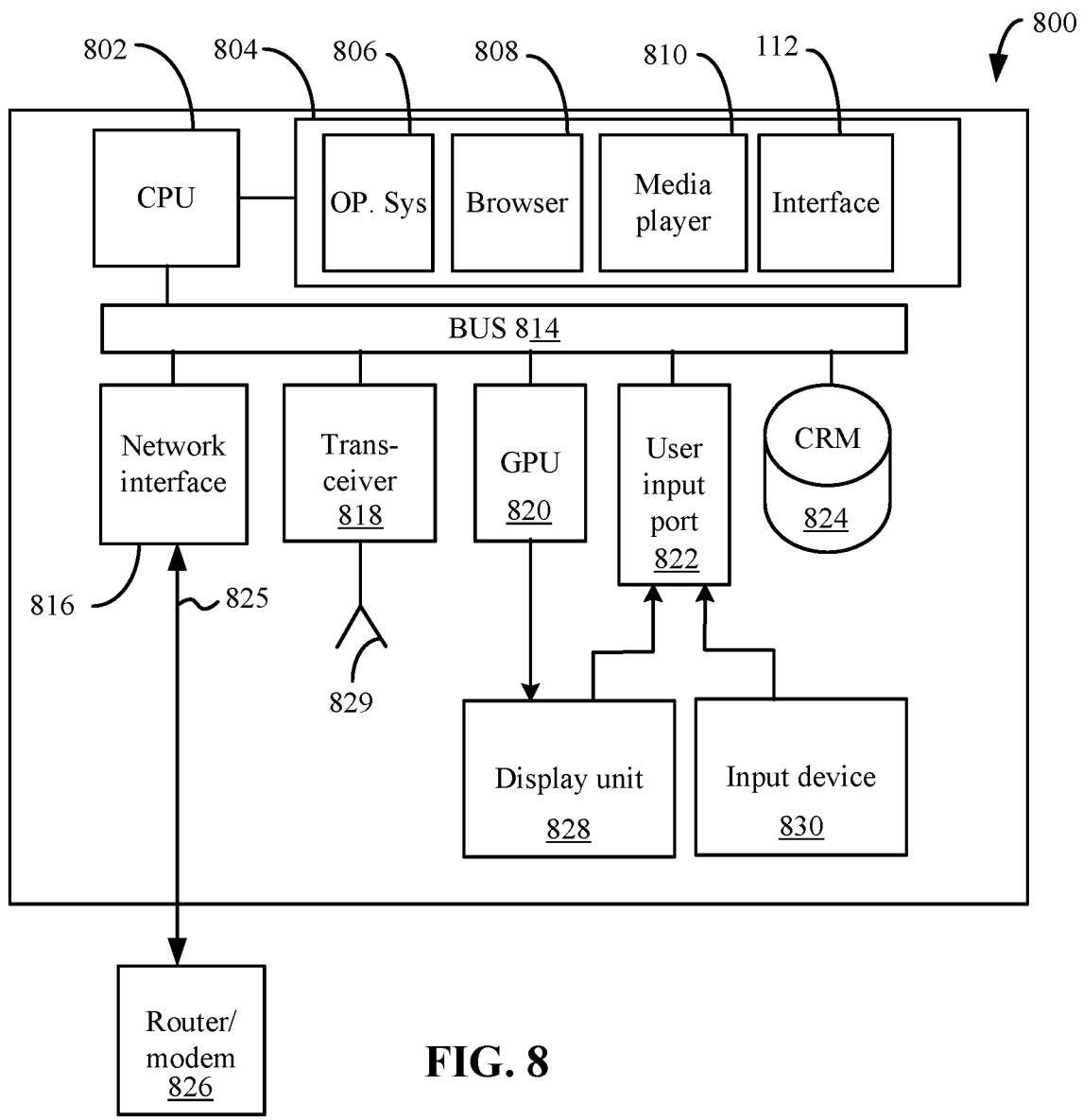
FIG. 8 depicts a diagrammatic view of an apparatus for viewing video content and advertisements.

Referring to FIG. 8, a diagrammatic view of an apparatus 800 for viewing video content and advertisements is illustrated. In selected embodiments, the apparatus 800 may include a processor (CPU) 802 operatively coupled to a processor memory 804, which holds binary-coded functional modules for execution by the processor 802. Such functional modules may include an operating system 806 for handling system functions such as input/output and memory access, a browser 808 to display web pages, and media player 810 for playing video. The modules may further include interface 112. The memory 804 may hold additional modules not shown in FIG. 8, for example modules for performing other operations described elsewhere herein.

A bus 814 or other communication component may support communication of information within the apparatus 800. The processor 802 may be a specialized or dedicated microprocessor configured to perform particular tasks in accordance with the features and aspects disclosed herein by executing machine-readable software code defining the particular tasks. Processor memory 804 (e.g., random access memory (RAM) or other dynamic storage device) may be connected to the bus 814 or directly to the processor 802, and store information and instructions to be executed by a processor 802. The memory 804 may also store temporary variables or other intermediate information during execution of such instructions.

A computer-readable medium in a storage device 824 may be connected to the bus 814 and store static information and instructions for the processor 802; for example, the storage device (CRM) 824 may store the modules 806, 808, 810 and 812 when the apparatus 800 is powered off, from which the modules may be loaded into the processor memory 804 when the apparatus 800 is powered up. The storage device 824 may include a non-transitory computer-readable storage medium holding information, instructions, or some combination thereof, for example instructions that when executed by the processor 802, cause the apparatus 800 to be configured to perform one or more operations of a method as described herein.

A communication interface 816 may also be connected to the bus 814. The communication interface 816 may provide or support two-way data communication between the apparatus 800 and one or more external devices, e.g., the streaming system 700, optionally via a router/modem 826 and a wired or wireless connection. In the alternative, or in addition, the apparatus 800 may include a transceiver 818 connected to an antenna 829, through which the apparatus 800 may communicate wirelessly with a base station for a wireless communication system or with the router/modem 826. In the alternative, the apparatus 800 may communicate with a video streaming system 700 via a local area network, virtual private network, or other network. In another alternative, the apparatus 800 may be incorporated as a module or component of the system 700 and communicate with other components via the bus 814 or by some other modality.

The apparatus 800 may be connected (e.g., via the bus 814 and graphics processing unit 820) to a display unit 828. A display 828 may include any suitable configuration for displaying information to an operator of the apparatus 800. For example, a display 828 may include or utilize a liquid crystal display (LCD), touchscreen LCD (e.g., capacitive display), light emitting diode (LED) display, projector, or other display device to present information to a user of the apparatus 800 in a visual display.

One or more input devices 830 (e.g., an alphanumeric keyboard, microphone, keypad, remote controller, game controller, camera or camera array) may be connected to the bus 814 via a user input port 822 to communicate information and commands to the apparatus 800. In selected embodiments, an input device 830 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 828, for example using a touch sensitive screen. A cursor control device may communicate direction information and command selections to the processor 802 and control cursor movement on the display 828. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
selecting, by a computing device, boundaries in videos by analyzing content changes between images from videos;
inputting, by the computing device, the images and the boundaries into a first prediction network to train the first prediction network to predict similarity between images that are within two boundaries in videos, wherein the training uses the boundaries to train parameters of the prediction network to predict images within the two boundaries have similar feature descriptors, wherein the training comprises:
generating by the computing device, first pairs of library images that are in a same scene within the two boundaries using the boundaries:
generating, by the computing device, second pairs of library images that are not in the same scene within the two boundaries; and
training, by the computing device, the first prediction network to predict that the first pairs of library images are more similar to each other than the second pairs of library images are similar to each other;
generating, by the computing device, feature descriptors that describe library images from videos in a video library offered to users of a video delivery service using the first prediction network; and
storing, by the computing device, the feature descriptors.

2. The method of claim 1, further comprising:
analyzing the videos to extract images from the videos that have a motion blur below a threshold.

3. The method of claim 1, further comprising:
analyzing the videos to determine boundaries between scene level changes in the videos, wherein the boundaries are determined when content changes between an image before a boundary and an image after the boundary meet a threshold.

4. The method of claim 1, further comprising:
receiving the feature descriptors that describe the library images from the first prediction network; and
reducing a size of the feature descriptors using a second prediction network to generate reduced feature descriptors that describe the library images.

5. The method of claim 4, wherein reducing the size of the feature descriptors using the second prediction network comprises:
reducing a number of dimensions of the feature descriptors and a number of possible values for the dimensions.

6. The method of claim 4, wherein reducing the size of the feature descriptors using the second prediction network comprises:
reducing an N-dimension real number vector of the feature descriptors to an M-dimension binary number vector, wherein N is a number greater than M.

7. The method of claim 4, wherein reducing the size of the feature descriptors using the second prediction network comprises:
minimizing quantization loss between the feature descriptors output by the first prediction network and the reduced feature descriptors output by the second prediction network.

8. The method of claim 4, wherein reducing the size of the feature descriptors using the second prediction network comprises:
using a function to distribute binary values for the reduced feature descriptors output by the second prediction network across the dimensions of the reduced feature descriptors.

9. The method of claim 1, wherein the training comprises:
training the first prediction network to predict images in a same scene within the two boundaries to be similar and to predict images not in the same scene not within the two boundaries to be not similar.

10. The method of claim 1, wherein:
the first prediction network is trained to predict that the first pairs of library images have a lower distance between feature descriptors, and
the first prediction network is trained to predict that the second pairs of library images have a higher distance between feature descriptors.

11. The method of claim 1, wherein the first prediction network comprises:
a set of first layers configured to classify low level sematic information in the images;
a set of second layers configured to classify high level semantic information in the images; and
an output layer configured to output the feature descriptors for the images.

12. The method of claim 1, further comprising:
receiving a search image;
using the prediction network to predict one or more library images for one or more videos that are predicted to be similar to the received image; and
providing the one or more library images for the one or more videos as a search result.

13. The method of claim 1, further comprising: receiving, by the computing device, a search image;
inputting, by the computing device, the image into a prediction network using the prediction network that includes parameters trained to predict images within two boundaries in a video have similar feature descriptors;
outputting, by the computing device, a feature descriptor from the prediction network for the search image;
comparing, by the computing device, the feature descriptor to a library of feature descriptors for library images from one or more videos;
selecting, by the computing device, one or more library images for one or more videos that include feature descriptors that are similar to the feature descriptor for the search image; and
providing, by the computing device, the one or more library images for the one or more videos as a search result.

14. The method of claim 13, further comprising:
reducing a number of dimensions of the feature descriptor for the search image and a number of possible values for the feature descriptor for the search image to generate a reduced feature descriptor; and
comparing the reduced feature descriptor to reduced feature descriptors that describe the library images.

15. The method of claim 13, further comprising:
receiving a selection of one of the library images; and
causing a video associated with the one of the library images to start playing.

16. A non-transitory computer-readable storage medium containing instructions, that when executed, control a computer system to be configured for:
selecting boundaries in videos by analyzing content changes between images from videos;
inputting the images and the boundaries into a first prediction network to train the first prediction network to predict similarity between images that are within two boundaries in videos, wherein the training uses the boundaries to train parameters of the prediction network to predict images within the two boundaries have similar feature descriptors, wherein the training comprises:
generating by the computing device, first pairs of library images that are in a same scene within the two boundaries using the boundaries:
generating, by the computing device, second pairs of library images that are not in the same scene within the two boundaries; and
training, by the computing device, the first prediction network to predict that the first pairs of library images are more similar to each other than the second pairs of library images are similar to each other;
generating feature descriptors that describe library images from videos in a video library offered to users of a video delivery service using the first prediction network; and
storing the feature descriptors.

17. The non-transitory computer-readable storage medium of claim 16, further configured for:
receiving the feature descriptors that describe the library images from the first prediction network; and
reducing a size of the feature descriptors using a second prediction network to generate reduced feature descriptors that describe the library images.

18. The non-transitory computer-readable storage medium of claim 17, wherein reducing the size of the feature descriptors using the second prediction network comprises:
reducing an N-dimension real number vector of the feature descriptors to an M-dimension binary number vector, wherein N is a number greater than M.

19. The non-transitory computer-readable storage medium of claim 16, further configured for:
analyzing the videos to determine boundaries between scene level changes in the videos, wherein the boundaries are determined when content changes between an image before a boundary and an image after the boundaries meet a threshold.

20. The non-transitory computer-readable storage medium of claim 16, further configured for:
receiving a search image;
inputting the image into a prediction network using the prediction network that includes parameters trained to predict images within two boundaries in a video have similar feature descriptors;
outputting a feature descriptor from the prediction network for the search image;
comparing the feature descriptor to a library of feature descriptors for library images from one or more videos;
selecting one or more library images for one or more videos that include feature descriptors that are similar to the feature descriptor for the search image; and
providing the one or more library images for the one or more videos as a search result.

21. The non-transitory computer-readable storage medium of claim 16, further configured for:
receiving a search image;
using the prediction network to predict one or more library images for one or more videos that are predicted to be similar to the received image; and
providing the one or more library images for the one or more videos as a search result.

22. An apparatus comprising:
one or more computer processors; and
a non-transitory computer-readable storage medium comprising instructions, that when executed, control the one or more computer processors to be configured for:
selecting boundaries in videos by analyzing content changes between images from videos;
inputting the images and the boundaries into a first prediction network to train the first prediction network to predict similarity between images that are within two boundaries in videos, wherein the training uses the boundaries to train parameters of the prediction network to predict images within the two boundaries have similar feature descriptors, wherein the training comprises:
generating by the computing device, first pairs of library images that are in a same scene within the two boundaries using the boundaries:
generating, by the computing device, second pairs of library images that are not in the same scene within the two boundaries; and
training, by the computing device, the first prediction network to predict that the first pairs of library images are more similar to each other than the second pairs of library images are similar to each other;
generating feature descriptors that describe library images from videos in a video library offered to users of a video delivery service using the first prediction network; and
storing the feature descriptors.

* * * * *